(12) United States Patent
Friedlander et al.

(10) Patent No.: US 8,819,555 B2
(45) Date of Patent: Aug. 26, 2014

(54) USER INTERFACE FOR AUDIO VIDEO DISPLAY DEVICE SUCH AS TV

(75) Inventors: Steven Friedlander, San Diego, CA (US); David Young, San Diego, CA (US); Sabrina Tai-Chen Yeh, Laguna Beach, CA (US)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 13/155,605

(22) Filed: Jun. 8, 2011

(65) Prior Publication Data

US 2012/0260168 A1 Oct. 11, 2012

Related U.S. Application Data

(60) Provisional application No. 61/473,098, filed on Apr. 7, 2011.

(51) Int. Cl.
*G06F 3/00* (2006.01)
*H04N 5/44* (2011.01)
*H04N 21/482* (2011.01)
*H04N 21/431* (2011.01)
*G06F 3/01* (2006.01)

(52) U.S. Cl.
CPC .......... *H04N 5/4403* (2013.01); *H04N 21/482* (2013.01); *H04N 21/4314* (2013.01); *G06F 3/017* (2013.01)
USPC ............................ 715/716; 715/723; 715/817

(58) Field of Classification Search
None
See application file for complete search history.

(56) References Cited

U.S. PATENT DOCUMENTS

| | | | |
|---|---|---|---|
| 7,873,622 B1 | 1/2011 | Karls et al. | |
| 7,953,730 B1 | 5/2011 | Bleckner et al. | |
| 2003/0160832 A1* | 8/2003 | Ridgley et al. | 345/854 |
| 2005/0039134 A1 | 2/2005 | Wiggeshoff et al. | |
| 2006/0026636 A1* | 2/2006 | Stark et al. | 725/37 |
| 2006/0041927 A1* | 2/2006 | Stark et al. | 725/139 |
| 2007/0143493 A1* | 6/2007 | Mullig et al. | 709/232 |
| 2009/0158326 A1* | 6/2009 | Hunt et al. | 725/38 |
| 2010/0069035 A1* | 3/2010 | Johnson | 455/404.1 |
| 2010/0082585 A1* | 4/2010 | Barsook et al. | 707/706 |
| 2010/0318551 A1* | 12/2010 | Lai | 707/765 |
| 2011/0055713 A1* | 3/2011 | Gruenewald et al. | 715/738 |
| 2011/0078603 A1* | 3/2011 | Koomullil | 715/769 |
| 2011/0289530 A1* | 11/2011 | Dureau et al. | 725/38 |

* cited by examiner

*Primary Examiner* — Ryan Pitaro
*Assistant Examiner* — Hua Lu
(74) *Attorney, Agent, or Firm* — John L. Rogitz; John M. Rogitz (57) ABSTRACT

A graphical user interface (GUI) for an audio video display device (AVDD) such as a TV includes content panels which can be selected for searching for additional information related to the content underlying the content panels. A history of previous searches is maintained in memory "stacked" notionally to the left or right of the current display so that a viewer can easily review previous search results using a simple scroll command.

20 Claims, 6 Drawing Sheets

Figure 1 System

Figure 2 example remote control

Figure 3 GUI (coarse)

Figure 4 GUI (fine)

USER INTERFACE FOR AUDIO VIDEO DISPLAY DEVICE SUCH AS TV

This application claims priority to U.S. provisional patent application Ser. No. 61/473,098, filed Apr. 7, 2011.

FIELD OF THE INVENTION

The present application relates generally to user interfaces (UI) for audio video display devices (AVDD) such as televisions (TVs).

BACKGROUND OF THE INVENTION

Graphical user interfaces (GUI) for audio video display devices (AVDD) such as TVs have been provided for enabling viewers to browse and select video streams for play on the TV. An electronic program guide (EPG) is an example. As understood herein, EPGs are convenient when viewer input is via a remote control (RC) but should other forms of user input be afforded, GUIs should be provided that are more conveniently tailored for that input.

SUMMARY OF THE INVENTION

According to principles set forth further below, an audio video display device (AVDD) has a processor, a video display presenting demanded images, and a computer readable storage medium bearing instructions executable by the processor to present on the display a first graphical user interface (GUI) including plural content panels, with each content panel representing a respective video. Responsive to a viewer selection of a content panel in the first GUI, the processor presents on the display a search GUI containing information pertaining to the selected content panel from the first GUI. Also, responsive to a viewer selection of an element from the search GUI, the processor presents on the display a new search GUI, maintaining a record of the first GUI and the search GUI. Further, responsive to a first scroll command, new content panels are scrolled onto the new search GUI with at least a first portion of the new search GUI not scrolling offscreen and with at least a second portion of the new search GUI scrolling offscreen to be replaced by the new content panels. On the other hand, responsive to a second scroll command, the new search GUI is replaced with the search GUI.

If desired, responsive to a repeated second scroll command the processor can replace the search GUI with the first GUI. In an example embodiment the first GUI includes eight content panels and a current video panel together arranged in a three by three grid. The eight content panels are scrolled responsive to the first scroll command, but the current video panel is not scrolled responsive to the first scroll command.

In some implementations records of the search GUI and new search GUI are maintained on the medium. The records can be stacked in memory in sequence. This facilitates embodiments wherein responsive to a reversed second scroll command received after the search GUI replaces the new search GUI, the processor replaces the search GUI with the new search GUI. The scroll command may be established by a human gesture in free space distanced from the display.

In another aspect, a method includes presenting a graphical user interface (GUI) on an audio video display device (AVDD). The GUI includes selector elements selectable to initiate a search for content related to a selected selector element. Responsive to receiving a selection of a first selector element, the method includes receiving a first search results set, storing the first search results set, and presenting at least a portion of the first search results set on the AVDD. Also, responsive to receiving a selection of a second selector element from a GUI presented on the AVDD, the method includes receiving a second search results set, storing the second search results set, and replacing the portion of the first search results on the AVDD with at least a portion of the second search results. Responsive to a scroll command, the portion of the second search results is replaced on the AVDD with the first search results.

In another aspect, an audio video display device (AVDD) has a processor, a video display presenting demanded images, and a computer readable storage medium bearing instructions executable by the processor to present on the display a first graphical user interface (GUI) including plural content panels. Responsive to a viewer selection of a content panel in the first GUI, the processor presents on the display a search GUI containing information pertaining to the selected content panel from the first GUI. Also, responsive to a viewer selection of an element from the search GUI, the processor presents on the display a new search GUI and responsive to a first scroll command, the processor replaces the new search GUI with the search GUI.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
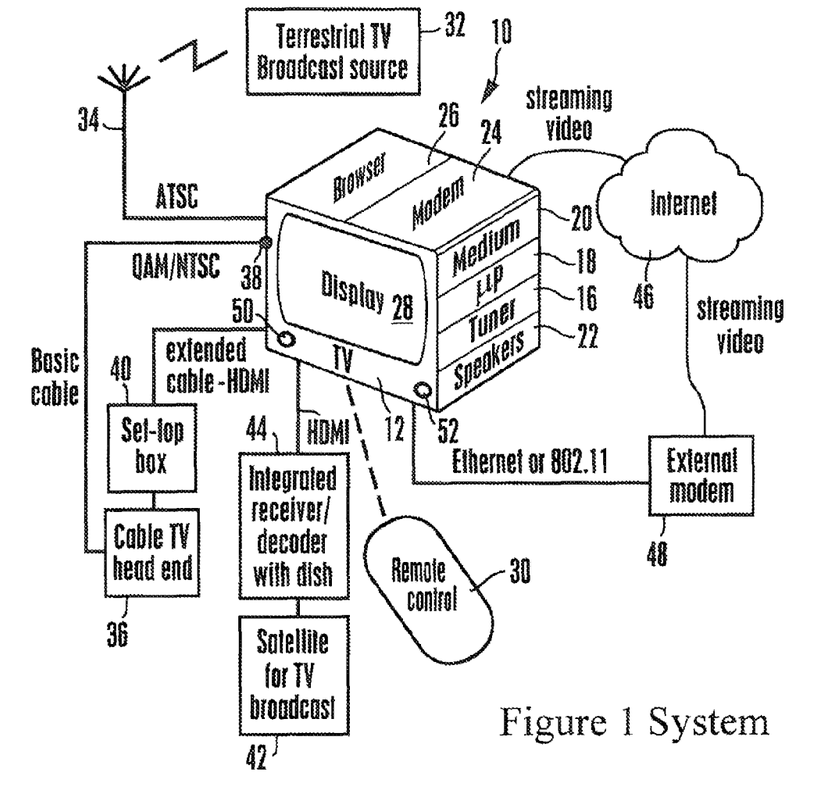
FIG. 1 is a block diagram of a non-limiting example system in accordance with present principles.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display, and may be a touch screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 16 to provide to the processor 16 video images of viewers looking at the display 28. Furthermore, a microphone 52 may be provided on the chassis or separate therefrom and can be electrically connected to the processor 16 to provide viewer-generated voice commands to the processor 16.

Figure 2:
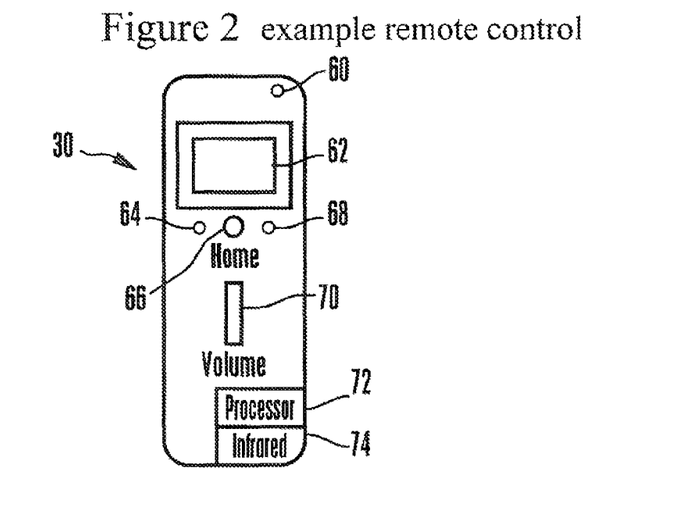
FIG. 2 is a plan view of an example remote control (RC) that may be used to control the graphical user interfaces (GUI) described herein, schematically showing the processor and wireless transceiver.

FIG. 2 shows that an example RC 30 may include a power on key 60 that can be toggled to energize and deenergize the AVDD 12. A touch-sensitive pad 62 may be provided against which a user can move his finger to correspondingly move a screen cursor on the display 28. Tapping the pad 62 can generate a "select" signal, it being understood that point-and-click devices other than the touch sensitive pad 62 may be used.

Also, a back key 64 may be provided to cause the display 28 to go back a screen shot, i.e., to present the screen shot immediately prior to the one being displayed when the back signal is generated, so as to enable a user to navigate through the various GUIs shown herein. A home key 66 may be provided to cause the below-described "home" GUI to be presented on the display 28, and an options key 68 may be provided to allow a user to cause a list of GUI options to be presented in the display 28. Volume output by the speakers 22 of the AVDD 12 can be controlled using a volume up/down rocker key 70. Manipulation of a key or the pad 62 on the RC 30 causes a respective signal to be sent to an RC processor 72 in the RC 30, which transmits the corresponding command to the AVDD 12 using a wireless transceiver 74 such as but not limited to an infrared transceiver. In addition, if desired four arrow keys may be arranged on the RC 30 to move a cursor up, down, left, and right on the display 28. Also, channel up/down keys may be provided as well as a microphone for voice input. A full QWERTY keyboard or keypad may be provided if desired. The touch pad 62 may be provided with a buzzer or other device to generate tactile feedback to the user.

Figure 3:
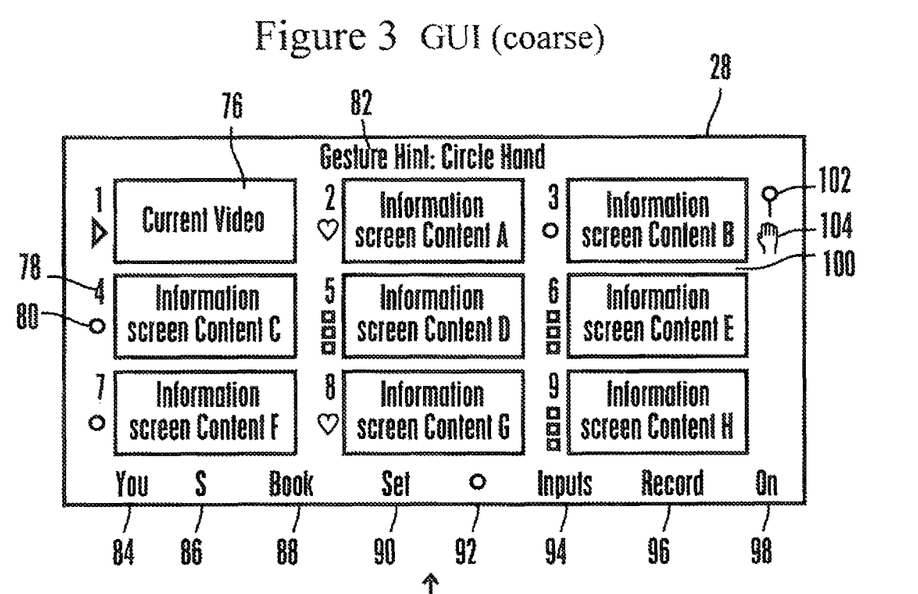
FIG. 3 is a screen shot of a nine panel GUI in a coarse mode suitable for gesture control.
Figure 4:
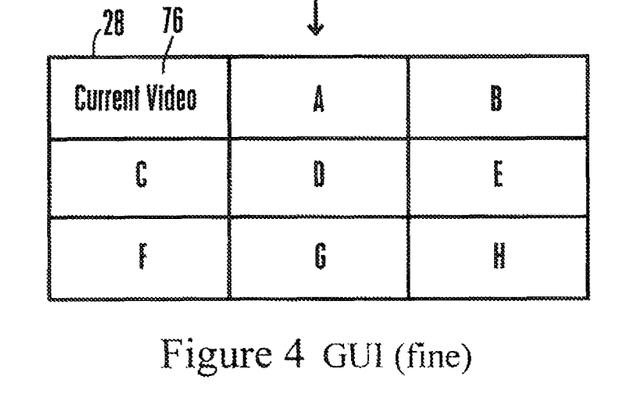
FIG. 4 is a screen shot of a nine panel GUI in a fine mode suitable for RC control.

FIGS. 3 and 4 show an example home GUI that may be presented on the display 28 of the AVDD 12. In the embodiment shown in FIG. 3, nine information panels arranged as shown in three rows of three panels each present visual content. The panels shown in FIG. 3 are of equal size with each other and are rectangular as shown. According to the embodiment shown in FIG. 3, the top left panel 76 of the GUI always shows the currently selected video content, typically either televised content from a selected TV channel or streaming video from a selected website. Information pertaining to available video content is presented in the other eight panels. This information typically includes a photograph or other image, a content source logo indicating the source of the content represented by the panel, and text typically describing the title of the content and other information.

As shown at 78, a numeral may be provided next to each panel, so that the panels may be numbered onscreen from one to nine as shown. This facilitates a user selecting to play video content from a panel by saying the numeral associated with the panel. Also, as shown at 80 a genre indicator may be presented next to each panel. The genre indicator may be an arrow in the case of the first panel 76 indicating that the first panel 76 is presenting the currently selected video. The genre indicator may be a heart (as shown in FIG. 3 for panel 2) indicating the underlying video content has been selected by the user as a "favorite". Other genre indicators may be presented respectively representing "history", meaning that the content associated with the panel had been presented previously, "recommended", meaning that the content associated with the panel is recommended by a recommendation engine executed by the AVDD processor 18, and so on, e.g., "frequently viewed", "promotional content". A user can select to present panels associated with content of only a single genre.

Additionally, if desired the GUI shown in FIG. 3 may present gesture hints 82, describing in text and/or animated hand motion a gesture and its associated command that the user may make, which can be captured by the camera 50 and correlated to the respective command by the processor 18 executing image recognition software. Thus, while viewer input may be afforded by making the display 28 a touch-sensitive display that a viewer can touch and thereby enter commands, present principles envision using viewer gestures in free space, i.e., gestures in which the viewer is distanced from the display 28 as would typically be the case for a TV viewer, with the viewer not touching the display but making gestures that are captured by the camera 50 and correlated to commands by the processor 18 executing image recognition software.

Further, a menu of selections may be presented as shown along the bottom of the GUI, including a "just for you" selector 84 to cause the GUI to contain panels with content personalized to a recognized user. A search selector 86 can be selected to cause a search for a user-input term to be executed. Also, a bookmark selector 88 can be selected to bookmark the currently playing video in panel 76 or to bookmark content in a panel over which the screen cursor is positioned.

Still referring to FIG. 3, a settings selector element 90 if selected causes a setting menus to be presented to control settings of the GUI. A queue selector element 92 may be presented to cause a list of enqueued programs to be presented on the display 28, and an inputs selector element 94 may be presented, selection of which causes a list of available input sources, e.g., "disk player, cable, satellite" to be presented on the display 28. A recommendations selector element 96 may be presented and if selected causes a list of recommended programming to be presented on the display 28. The list may be generated by a content recommendation engine such as the "Navi" engine made by Sony Corp. A "what's on" selector element 98 may be provided and if selected causes a list of current and future programs such as an electronic program guide (EPG) to be presented on the display 28. Indeed, an EPG may be presented in one of the panels shown in FIG. 3.

In any case, as mentioned above in the example shown the currently selected video content is always presented in the upper left panel 76 of the GUI. Should the user select another panel by using the RC 30 or by speaking the number of the panel or by the appropriate gesture captured by the camera 50, video content from the source associated with the selected panel automatically replaces the video content which was presented in the upper left panel 76 prior to receiving the new select signal. Indeed, should the user scroll the panels left or right to view additional content the upper left panel 76 remains unmoving as the other panels move on and off the display 28 as they are replaced by previously hidden content panels, with the upper left panel 76 always showing the currently selected video program.

The panel layout shown in FIG. 3 is somewhat coarse in that a visible border space 100 of many pixels width exists between adjacent panels as shown. Such a coarse representation facilitates control using gestures, although navigation by voice and by use of the RC 30 is always preferably enabled regardless of whether the GUI is in the coarse or fine view. FIG. 4 shows that if the user selects the fine view, the border space 100 disappears between adjacent panels, a view more suitable for RC control than gesture control although as stated above all three modes of command input (RC, voice, and gesture) remain enabled simultaneously with each other if desired.

Transition between the two views of FIGS. 3 and 4 may be effected by an appropriate hand gesture in free space (e.g., a vertical motion of the hand distanced from the display 28 and detected by the camera 50) or by an appropriate voice command (e.g., "fine" or "coarse"), or by selecting, using the RC 30, "fine" or "course" from a settings menu accessed by selecting the settings selector element 90 or by pressing a key on the RC 30 or by simply grasping the RC, which is detected by the camera 50 and inferred by the processor 18 to correlate to a command to move to the "fine" screen of FIG. 4. The larger panels in the fine mode of FIG. 4 can be used to present more information than is presented in the panels of FIG. 3.

The GUI shown in FIGS. 3 and 4 may be removed from the screen and the currently playing video presented on the full display 28 by, e.g., toggling the home key on the RC 30. Voice command input may be enabled by voicing a phrase such as "hello TV", which is detected by the microphone 52 and using voice recognition software correlated by the processor 18 to a command to enable voice commands. Voice input may also be enabled using the RC 30 to select the "search" selector element 86. To indicate that voice commands are enabled, an icon such as an image of a microphone 102 can be presented on the display 28. Gesture command input may be enabled by waving the hand, which is detected by the camera 50 and using image recognition software correlated by the processor 18 to a command to enable gesture commands. To indicate that gesture commands are enabled, an icon such as an image of a hand 104 can be presented on the display 28.

Non-limiting examples of corresponding RC, voice, and gesture commands that accomplish the same tasks are:

| RC COMMAND | VOICE COMMAND | GESTURE |
| --- | --- | --- |
| Channel up | "Channel up" | upward motion of hand |
| Channel down | "Channel down" | downward motion of hand |
| Volume decrease | "Quieter" | thumb down |
| Volume increase | "louder" | thumb up |

Additional gesture commands can be: pointed finger—attach cursor; move pointed finger or speak "move cursor [left] [right]"—move cursor per finger movement/voice command; clenched first or spoken "select"—select panel under cursor for further info; pump clenched first or voice command "play"—select panel under cursor to be new current video for presentation in pinned panel 76; two clenched fists or voice command "more info"—show expanded metadata window for cursor video, etc.

Now referring to FIGS. 5-8, assume that a viewer, using a voice command, gesture in free space, or RC 30 has positioned the cursor over one of the non-pinned content panels in FIG. 4 and selected the panel. In response, the processor 18 presents the GUI shown in FIG. 5, in which the top left panel 76 remains visible showing the current video but the top two panels to the right of the top left panel 76 are expanded into a single panel 110 in which a still image 112 and metadata 114 are presented related to the selected video. The expanded panel 110 is substantially the same size as the two upper right content panels combined. In presenting the GUI of FIG. 5 the processor can animate the image from the selected panel of FIG. 4 to move into the new panel 110.

Figure 5:
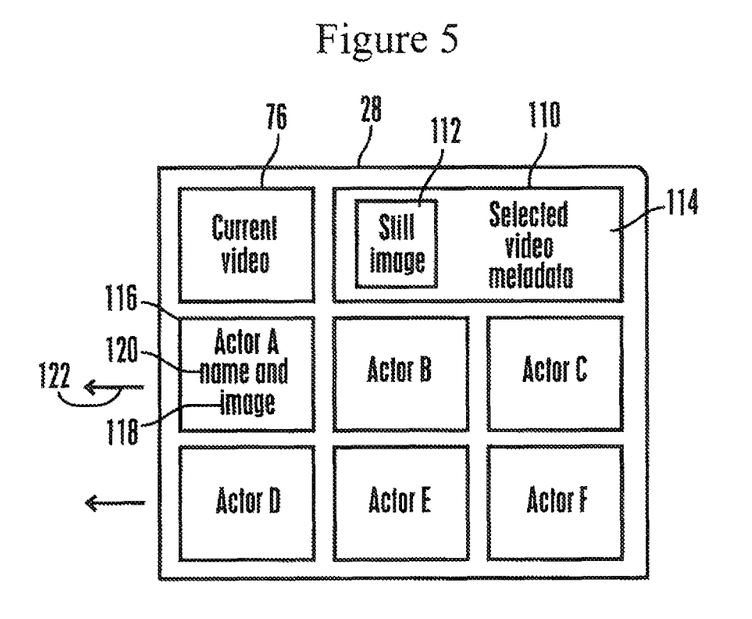
FIGS. 5-8 are screen shots of information GUIs based on the nine panel GUI of FIG. 4.
Figure 6:
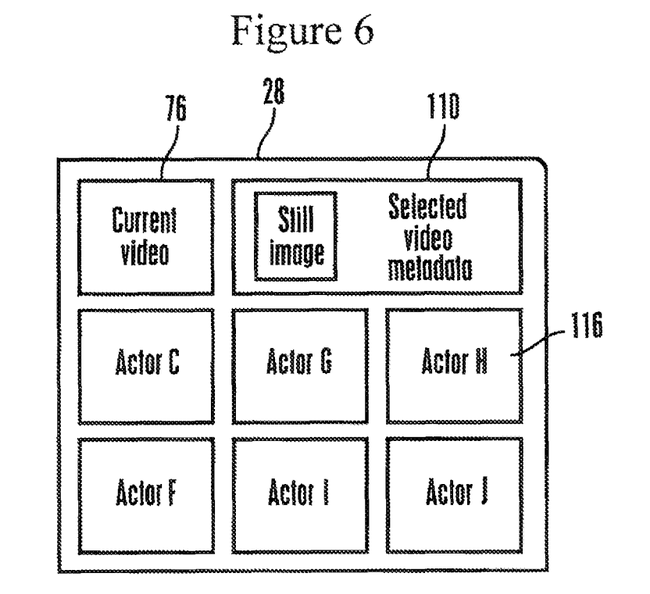

As also shown in FIG. 5, the bottom two rows of six panels each from FIG. 4 have been replaced by respective panels 116 each showing an image 118 and metadata 120 for a respective actor in the video represented in the expanded panel 110. Responsive to a viewer command to scroll left as indicated by the arrow 122, in the example shown, to scroll two columns to the left, the GUI of FIG. 5 animates to show the bottom two rows of panels 116 moving translationally to the left across the display 28, with the two left columns of panels 116 moving off the display and with two new columns representing respective actors in the selected video entering from the right, to arrive at the GUI of FIG. 6. Note that the two right-most columns of actor panels 116 in FIG. 6 represent additional actors from the video represented in the expanded panel 110. Note further that the expanded panel 110 remains "pinned", i.e., does not move between FIGS. 5 and 6, as is the case with the current video panel 76. A command to scroll right moves the panels back to the right so that the original actor panels 116 of FIG. 5 move back onto the display and the newer actor panels of FIG. 6 move off the display to the right.

Now suppose the viewer selects one of the actor panels 116, e.g., the panel representing "Actor G". In response, the processor 18 can use animation showing the photo from the selected actor panel 116 moving upward on the display 28, replacing the video image 112 of FIGS. 5 and 6 with an actor image 124 shown in FIG. 7 and replacing the video metadata 114 with actor-related metadata 126 of FIG. 7. Also, the actor panels 116 can be replaced with video panels 128, with each video panel 128 representing a video in which the actor represented in the expanded panel 110 appears. These video panels 128 can be scrolled left and right as discussed above in relation to the actor panels, with the current video panel 76 and expanded panel 110 remaining pinned in place (i.e., not moving as the panels 128 move).

Figure 8:
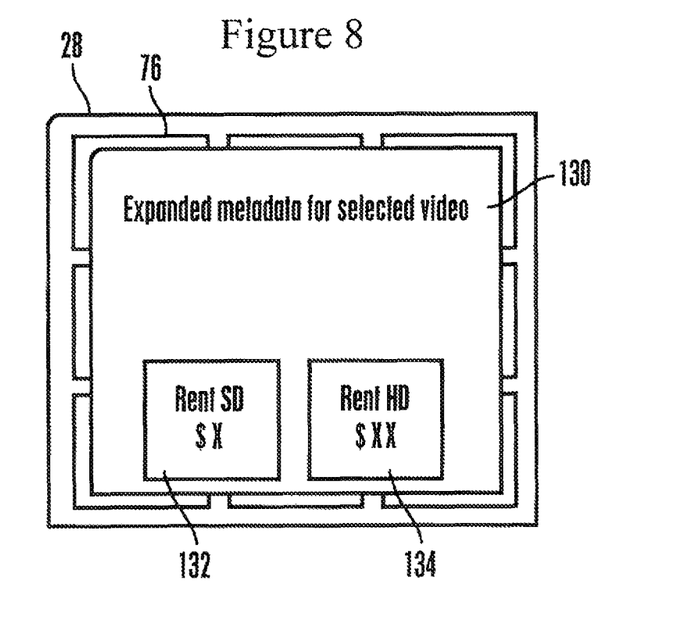

FIG. 8 shows that responsive to a command to show more information about, e.g., a video represented in a video panel 116, an expanded metadata window 130 can be overlaid on the GUI as shown showing additional information on the selected video. If desired the window 130 can contain selector elements 132, 134 for respectively purchasing the video in standard definition for one amount and high definition for another, typically higher, amount. In the embodiment shown, the window 130 overlays all of the center-most panel from FIG. 5 and most of the other nine panels.

It may now be appreciated that the above GUIs facilitate easily finding the cast members of a movie and then finding the movies a selected actor was in. Furthermore, the above GUIs, with relatively enlarged panels functioning a selector elements, works well for gesture command input.

Figure 9:
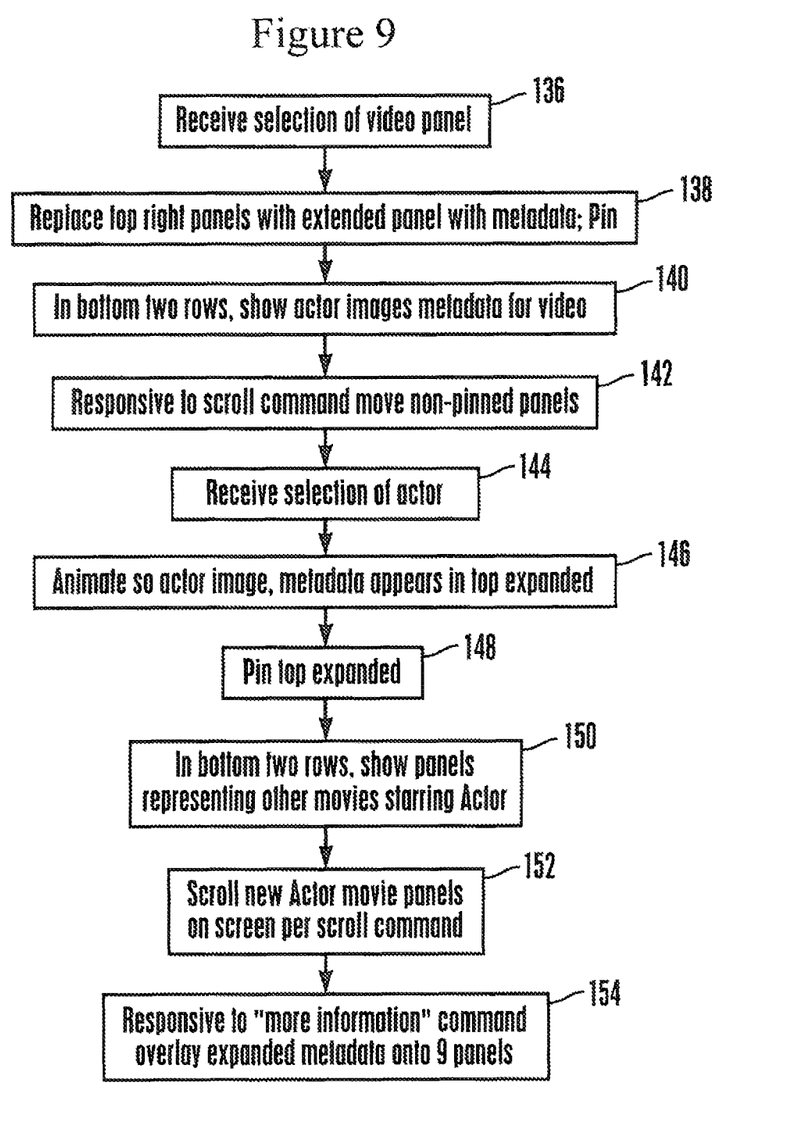
FIG. 9 is a flow chart of example logic appertaining to FIGS. 5-8.

FIG. 9 illustrates example logic that may be used in connection with the above disclosure. Commencing at block 136, a viewer selection of a video panel in FIG. 4 is received and at block 138 the top two panels of FIG. 4 are replaced by the expanded panel 110 of FIG. 5, if desired by animating the image from the selected panel of FIG. 4 up into the expanded panel 110 of FIG. 5 and "pinning" the panel 110. The bottom two rows of panels show respective images and metadata for respective actors in the selected video at block 140.

Moving to block 142, responsive to a scroll command the non-pinned panels 116 are moved as described and shown in cross-reference to FIGS. 5 and 6. Selection of an actor panel 116 at block 144 results in animating the image from the selected panel 116 into the expanded panel 110 at block 146, which is pinned at block 148. Block 150 indicates that the bottom two rows of panels become video panels 128 (FIG. 7) associated with the actor represented by the expanded panel 110. At block 152 viewer scroll commands are received and new video panels moved onscreen as appropriate representing additional videos the actor has appeared in, with the expanded panel 110 remaining pinned (unmoving) in place. Block 154 indicates that the GUI of FIG. 8 can be shown responsive to a "more information" command.

The panels, images, and metadata discussed above may be made available to the AVDD processor 18 via any of the communications shown in FIG. 1, e.g., through the STB, satellite receiver, Internet modem. In this regard, the AVDD may upload viewer commands for additional information and if the information is not already stored on the local medium 20 can relay the commands via uplink to a command server, which downloads the requested information.

Figure 10:
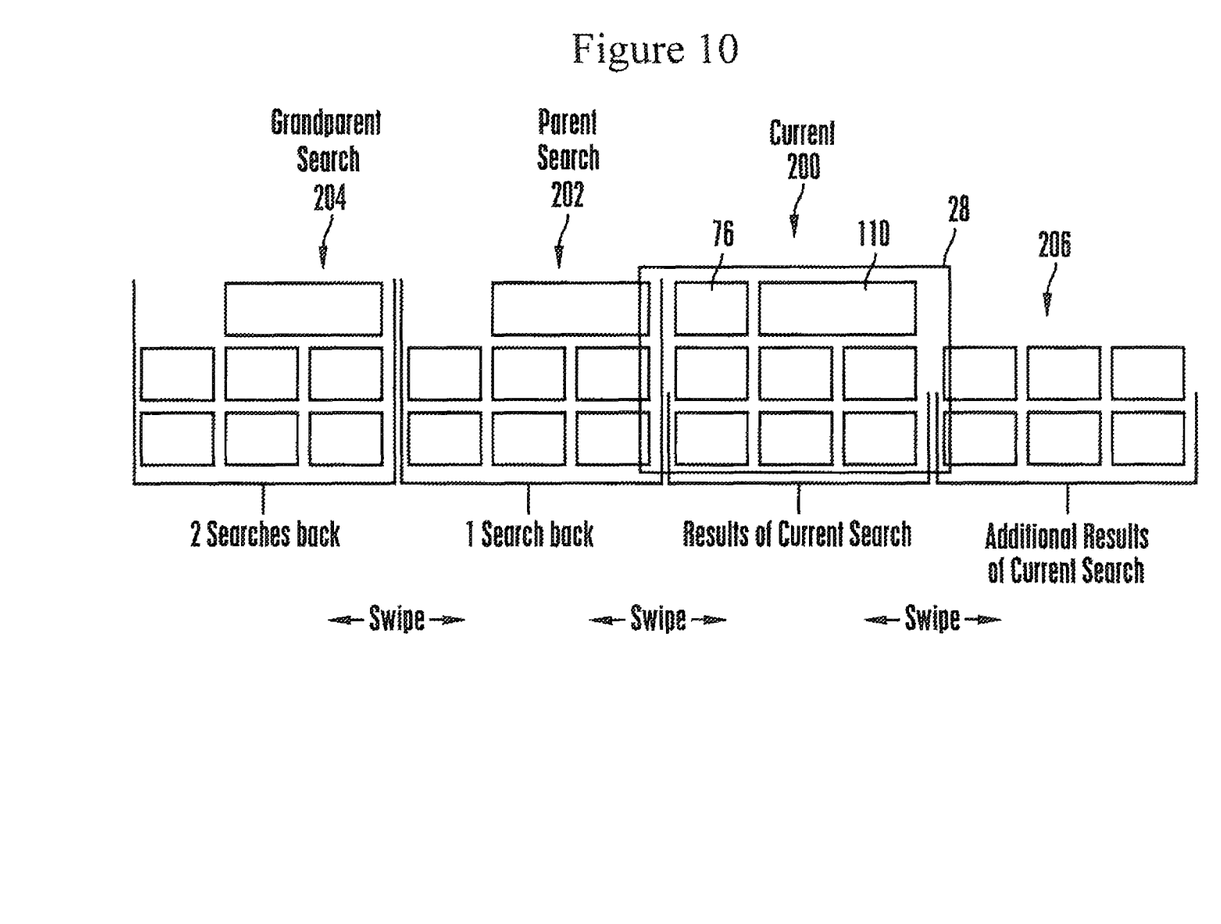
FIG. 10 is a schematic view of a data structure for stacking historical GUIs such that a viewer can unstuck them easily to review prior content searches.

FIG. 10 illustrates a data structure that may be maintained on, e.g., the medium 20 to enable a viewer to easily review previous searches using the above-described GUI. Recall in the example above that the viewer searched using the GUI of FIG. 5 for a particular actor, invoking the GUI of FIG. 7, which essentially represented the search results for the actor selected form FIG. 5. Continuing with this example, in FIG. 10 a current GUI record 200 is included in the data structure which, in the example shown, is a record of the current content panels, expanded panel 110, and live video panel 76 of FIG. 7, assuming that the GUI of FIG. 7 is being currently presented on the display 28.

The data structure also includes an immediately previous search history 202, in this example, of the expanded panel 110 and content panels that were shown in FIG. 5, which was the immediately previous search. Notionally, the immediately previous search history 202 is "stacked" just to the left of the current GUI record 200 in the data structure. In the same way, a grandparent search history 204 that records GUI contents of a search which was just immediately prior to the immediately previous search history 202 is "stacked" to the left, notionally, of the immediately previous search history 202. Of course, notional stacking may be reversed, i.e., may extend left to right instead of right to left. In any case it will be appreciated that the relationship of how search histories are maintained in memory is, notionally from right to left (or equivalently left to right) child-parent-grandparent and so on. The search history may, along these principles, stack "N" prior searches in memory.

Figure 7:
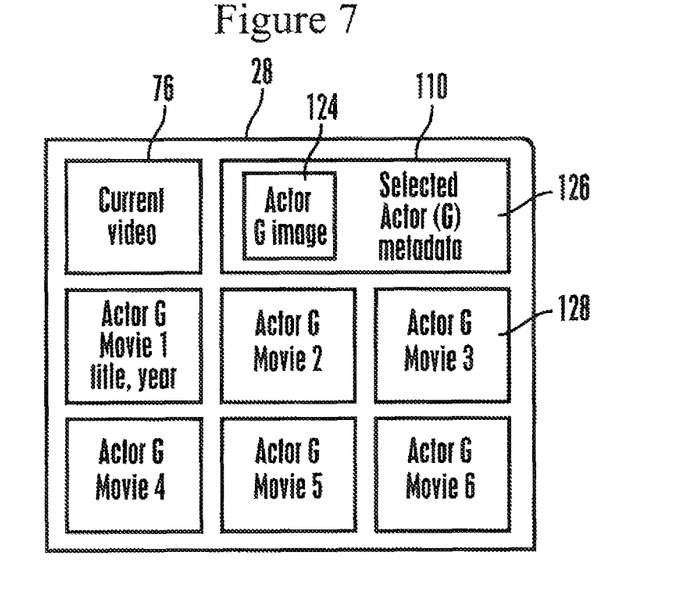

Recall from the above discussion of FIGS. 5 and 7 that additional results for the current search whose subject is represented in the expanded panel 110 may be viewed by scrolling them onto the display 28. As also shown in FIG. 10, a current search results 206 is, in the example shown, stacked to the right of the current GUI record 200. The search records discussed above include a screen position and content information of the associated content panels and expanded panels.

With the above in mind, a viewer can view displayed results of the current search on the display 28 and, using a first scroll command, additional results of the current search. In such a case, results of the current search that are scrolled off-screen are maintained in memory but are not represented in FIG. 10. Reversing the first scroll command causes the results of the current search that were scrolled off-screen to reappear on the display 28.

Then, should the viewer wish to review not just displayed and undisplayed current search results but also the results of previous searches, a second scroll command may be used to exploit the data structure of FIG. 10. The second scroll command, when input once, causes the immediately previous search history 202 to scroll back into view on the display 28 along with its respective expanded panel 110 showing different content than the expanded panel 110 that had been shown prior to the second scroll command, replacing the current GUI 200. A second input of the second scroll command causes the grandparent search history 204 to scroll back into view on the display 28 along with its respective expanded panel 110, replacing the parent search results (the immediately previous search history 202). Reversing the second scroll command causes the immediately previous search history 202 to scroll back into view and reversing the second scroll command once more causes the next most recent search results (in this case, the current record 200) to scroll back into view on the display 28.

The first scroll command to scroll through current search results may be a pointed finger moving left (or right) in free space relative to the display 28 without touching the display 28, when gesture command input mode is enabled. When voice command input is enabled the first scroll command can be, as an example, the spoken word "more". The second scroll command to review previous searches can be, as an example, a first moving left (or right) in free space relative to the display 28 without touching the display 28, when gesture command input mode is enabled. When voice command input is enabled the first scroll command might be the spoken word "previous search" or just "previous". Two such commands can be required to move from the current search 200 to the grandparent search 204. A lengthier command can be interpreted to be two scroll commands.

While the particular USER INTERFACE FOR AUDIO VIDEO DISPLAY DEVICE SUCH AS TV is herein shown and described in detail, it is to be understood that the subject matter which is encompassed by the present invention is limited only by the claims.

What is claimed is:

1. Audio video display device (AVDD) comprising:
processor;
video display presenting demanded images;
computer readable storage medium bearing instructions executable by the processor to:
present on the display a first graphical user interface (GUI) including plural content panels, each content panel representing a respective video;
responsive to a viewer selection of a content panel in the first GUI, present on the display a search GUI containing information pertaining to the selected content panel from the first GUI;
responsive to a viewer selection of a panel in the search GUI, present on the display a first new search GUI including plural content panels, responsive to a viewer selection of a panel from the first new search GUI, present at least a second new search GUI including plural content panels that are selectable to present a third new search GUI responsive to selection of a panel from the second new search GUI, wherein the second new search GUI is a "child" new search GUI relative to the "parent" first new search GUI, and wherein the instructions are executable by the processor to present N subsequent child new search GUIs responsive to viewer selection of a panel from an N−1 parent new search GUI;
maintain a record of the search GUI, the first, second, and third new search GUIs, and the N new search GUIs;
responsive to a first continuous scroll command in a first direction on the first new search GUI, scroll new content panels onto the first new search GUI with at least a first portion of the first new search GUI not scrolling offscreen and with at least a second portion of the first new search GUI scrolling offscreen to be replaced by the new content panels;
responsive to a second continuous scroll command in a second direction different from the first direction, replace the first new search GUI with the search GUI;
responsive to a third continuous scroll command in substantially the opposite direction as the second direction, replace the first new search GUI with the second new search GUI;
responsive to at least one scroll command subsequent to the third scroll command also in substantially the opposite direction as the second direction and in a different direction than the first direction, replace a parent N−1 new search GUI with a child N new search GUI such that the new search GUIs are stacked in the sequence in which their respective searches were conducted; and
responsive to at least one scroll command subsequent to the second scroll command in substantially the same direction as the second direction, replace a child N new search GUI with a parent N−1 new search GUI; wherein each child N new search GUI and its respective parent N−1 new search GUI are associated with searches executed prior to respective scroll commands to scroll from one GUI to another being input by a viewer.

2. The AVDD of claim 1, wherein the first GUI includes content panels and a current video panel together arranged in an N×M grid, wherein N and M are integers equal to or greater than two, the content panels being scrolled responsive to the first scroll command, the current video panel not being scrolled responsive to the first scroll command.

3. The AVDD of claim 1, wherein records of the search GUI and new search GUIs are maintained on the medium.

4. The AVDD of claim 1, wherein the scroll commands are each established by a human gesture in free space distanced from the display.

5. The AVDD of claim 4, wherein at least one panel presented on the display includes a gesture hint indicating a particular human gesture in free space to make to select the panel with the gesture hint.

6. The AVDD of claim 1, wherein an N new search GUI presented on the display responsive to a scroll command presents its respective content panels in the same position relative to each other on the N new search GUI as they were when the respective N new search GUI was initially presented prior to input of the scroll command.

7. The AVDD of claim 1, wherein the scroll commands are established by voice command input received by the AVDD.

8. The AVDD of claim 7, wherein at least one scroll command established by voice command input is "previous search."

9. Method comprising: presenting a graphical user interface (GUI) on an audio video display device (AVDD), the GUI including selector elements selectable to initiate a search for content related to a selected selector element;
responsive to receiving a selection of a first selector element, receiving a first search results set including information related to content represented by the selected selector element, the information related to the content being information related to subject matter in the content and not to additional content programming;
storing the first search results set;
presenting at least a portion of the first search results set on the AVDD;
responsive to receiving a selection of a second selector element from a GUI presented on the AVDD, receiving a second search results set including additional content programming information related to the subject matter invoked by selection of the first selector element,
storing the second search results set;
presenting at least a portion of the second search results set on the AVDD;
wherein at least one selection of a selector element derived from the second search results set is received subsequent to presenting the second search results set such that at least in part responsive to receiving selection of at least one N subsequent selector element from at least one N GUI presented on the AVDD, an N search results set is received including additional content programming information related to the subject matter invoked by selection of an N−1 selector element from an N−1 GUI, the N GUIs being continuously scrollable after being initially presented on the AVDD such that receiving plural continuous scroll commands at the AVDD in substantially the same direction causes the N GUIs to be consecutively scrolled in the sequence in which they were initially presented.

10. The method of claim 9, wherein the scroll commands are left or right scroll commands relative to the AVDD.

11. The method of claim 9, wherein the N GUIs are scrollable based on human gestures in free space detected by the AVDD.

12. The method of claim 11, wherein at least one panel includes a gesture hint indicating a particular human gesture in free space to make to select the panel with the gesture hint.

13. The method of claim 9, wherein the method further comprises, responsive to scroll commands at the AVDD in a different direction than the direction causing the N GUIs to be consecutively scrolled in the sequence in which they were initially presented, causing the N GUIs to be consecutively scrolled in a sequence opposite to the sequence in which they were initially presented.

14. The method of claim 9, wherein content panels for each of the N GUIs are presented when scrolled to in the same position relative to each other on their respective GUI as they were when initially presented.

15. Audio video display device (AVDD) comprising:
processor;
display; and
computer readable storage medium bearing instructions executable by the processor to:
present on the display a first graphical user interface (GUI) including plural content panels;
responsive to a viewer selection of a content panel in the first GUI, present on the display a search GUI containing information panels pertaining to the selected content panel from the first GUI;
responsive to a viewer selection of an information panel from the search GUI, present on the display at least a first new search GUI including content panels representing content associated with the panel selected from the search GUI, wherein responsive to a viewer selection of a panel from the first new search GUI, present at least a second new search GUI including plural content panels representing content associated with the panel selected from the first new search GUI, the content panels of the second new search GUI being selectable to present a third new search GUI responsive to selection of a panel from the second new search GUI such that the second new search GUI is a "child" new search GUI relative to the "parent" first new search GUI and the third new search GUI is a "child" new search GUI of the "parent" second new search GUI, wherein the instructions are executable by the processor to present N subsequent child new search GUIs responsive to viewer selection of a panel from an N−1 parent new search GUI; and
responsive to consecutive continuous scroll commands in the same direction, replace a parent new search GUI with its respective child new search GUI, the continuous scroll commands being received at a time after searches associated with each of the new search GUIs were initially executed.

16. The AVDD of claim 15, wherein the first GUI includes content panels and a current video panel together arranged in an N×M grid, wherein N and M are integers equal to or greater than two, the content panels being scrolled responsive to a scroll command in a direction other than the direction of the consecutive scroll commands, the current video panel not being scrolled responsive to the scroll command in the direction other than the direction of the consecutive scroll commands.

17. The AVDD of claim 15, wherein records of the search GUI and new search GUIs are maintained on the medium.

18. The AVDD of claim 15, wherein the first scroll command is established by a human gesture in free space distanced from the display.

19. The AVDD of claim 18, wherein at least one panel presented on the display includes a gesture hint indicating a particular human gesture in free space to make to select the panel with the gesture hint.

20. The AVDD of claim 15, wherein an N new search GUI presented on the display responsive to a scroll command presents its respective content panels in the same position relative to each other on the N new search GUI as the content panels were initially presented when the N search was initially executed.

* * * * *